United States Patent
Huffman et al.

(10) Patent No.: US 12,505,367 B2
(45) Date of Patent: Dec. 23, 2025

(54) VISUALLY DEPICTING A TOPOLOGY OF A QUANTUM DEVICE THAT CONVEYS QUANTUM OPERATIONAL CHARACTERISTICS

(71) Applicant: International Business Machines Corporation, Armonk, NY (US)

(72) Inventors: Joel Russell Huffman, Austin, TX (US); Francis Harkins, Winchester (GB); Stefan A. G. Van Der Stockt, Austin, TX (US); Grace Lindsell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 18/071,770

(22) Filed: Nov. 30, 2022

(65) Prior Publication Data
US 2024/0177036 A1     May 30, 2024

(51) Int. Cl.
*G06N 10/20*     (2022.01)
(52) U.S. Cl.
CPC .................................. *G06N 10/20* (2022.01)
(58) Field of Classification Search
CPC .............................. G06N 10/00; G06N 10/20
See application file for complete search history.

(56) References Cited

U.S. PATENT DOCUMENTS

| | | | |
|---|---|---|---|
| 7,292,243 B1 | 11/2007 | Burke | |
| 11,409,426 B2 | 8/2022 | Thom et al. | |
| 12,380,354 B1 * | 8/2025 | Retzker | G01N 24/08 |
| 2018/0365587 A1 * | 12/2018 | Barzegar | G06N 10/60 |
| 2019/0156239 A1 * | 5/2019 | Martinis | G06N 10/70 |
| 2021/0256406 A1 | 8/2021 | Mueller et al. | |
| 2022/0109095 A1 * | 4/2022 | Mergenthaler | H10N 60/0912 |
| 2022/0147856 A1 * | 5/2022 | Kliuchnikov | G06N 10/00 |
| 2024/0028939 A1 * | 1/2024 | Akhalwaya | G06N 3/08 |
| 2024/0031238 A1 * | 1/2024 | Griffin | H04L 41/12 |
| 2024/0160976 A1 * | 5/2024 | Klimov | G06N 10/20 |
| 2024/0177036 A1 * | 5/2024 | Huffman | G06N 10/20 |
| 2024/0177046 A1 * | 5/2024 | Jin | G06N 10/00 |
| 2024/0289663 A1 * | 8/2024 | Kong | G06N 5/01 |
| 2025/0053838 A1 * | 2/2025 | Ishii | G06N 10/80 |

* cited by examiner

*Primary Examiner* — David E Choi
(74) *Attorney, Agent, or Firm* — Shackelford, McKinley & Norton, LLP; Robert A. Voigt, Jr.

(57) ABSTRACT

A method, system and computer program product for visually depicting a topology of a quantum device. Quantum system calibration data is retrieved, which includes the number of qubits utilized by the quantum device and a coupling map, which provides connectivity data pertaining to how qubits of the quantum device are interconnected. Furthermore, the operational characteristics of the quantum device are retrieved. A topology diagram of the quantum device is then generated and displayed based on the quantum system calibration data and the operational characteristics of the quantum device, where the nodes in the topology diagram represent the qubits utilized by the quantum device and are interconnected in the topology diagram based on the coupling map. Furthermore, the distance of each line interconnecting two nodes is based on the operational characteristics of the quantum device, such as the value of the operational characteristic involving the qubits represented by the two nodes.

20 Claims, 6 Drawing Sheets

VISUALLY DEPICTING A TOPOLOGY OF A QUANTUM DEVICE THAT CONVEYS QUANTUM OPERATIONAL CHARACTERISTICS

TECHNICAL FIELD

The present disclosure relates generally to tools for visualizing quantum hardware topology, and more particularly to visually depicting a topology of a quantum device that conveys quantum operational characteristics.

BACKGROUND

Quantum computing is a type of computation that harnesses the collective properties of quantum states, such as superposition, interference, and entanglement, to perform calculations. The devices that perform quantum computations are known as quantum computers. Though current quantum computers are too small to outperform usual (classical) computers for practical applications, they are believed to be capable of solving certain computational problems, such as integer factorization, substantially faster than classical computers.

There are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When it is measured, however, it is always 0 or 1 where the probability of either outcome depends on the qubit's quantum state immediately prior to measurement.

In quantum computing and specifically the quantum circuit model of computation, a quantum logic gate (or simply quantum gate) is a basic quantum circuit operating on a small number of qubits. They are the building blocks of quantum circuits, such as classical logic gates being the building blocks of conventional digital circuits.

There are various tools for visually displaying the hardware topology of a quantum device comprised of quantum logic gates operating on qubits. For example, IBM® Quantum visually depicts a quantum device consisting of quantum logic gates operating on qubits. In such a depiction, qubits may be represented as circles and the supported two-qubit gate operations are displayed as lines connecting the qubits.

Unfortunately, users may not be able to infer the operational characteristics of the quantum device based on such a depiction.

SUMMARY

In one embodiment of the present disclosure, a method for visually depicting a topology of a quantum device comprises retrieving quantum system calibration data, where the quantum system calibration data comprises a coupling map and a number of qubits utilized by the quantum device, and where the coupling map provides connectivity data pertaining to how qubits of the quantum device are interconnected. The method further comprises retrieving operational characteristics of the quantum device. The method additionally comprises generating and displaying a topology diagram based on the retrieved quantum system calibration data and the retrieved operational characteristics of the quantum device, where the topology diagram comprises a plurality of nodes representing the qubits utilized by the quantum device, where the plurality of nodes are interconnected in the topology diagram based on the coupling map, where each operational characteristic of the retrieved operational characteristics of the quantum device corresponds to an operational characteristic involving qubits represented by two nodes, and where a distance of each line interconnecting two nodes of the plurality of nodes is based on the operational characteristic involving the qubits represented by the two nodes of the quantum device.

Additionally, in one embodiment of the present disclosure, the distance of each line interconnecting the two nodes of the plurality of nodes is proportional to a value of the operational characteristic involving the qubits represented by the two nodes.

Furthermore, in one embodiment of the present disclosure, the operational characteristic is selected from the group consisting of an error rate and an execution time.

Additionally, in one embodiment of the present disclosure, the distance of each line interconnecting the two nodes of the plurality of nodes corresponds to a relative range of values of the operational characteristic involving the qubits represented by the two nodes.

Furthermore, in one embodiment of the present disclosure, the one or more lines in the topology diagram utilize a symbol to truncate or expand a visual distance.

Additionally, in one embodiment of the present disclosure, the symbol represents one of the following in the group consisting of a standard deviation, an interquartile range and an order of magnitude in a positive or a negative direction.

Furthermore, in one embodiment of the present disclosure, the operational characteristics of the quantum device are obtained from one or more simulations of the quantum device.

Other forms of the embodiments of the method described above are in a system and in a computer program product.

Accordingly, embodiments of the present disclosure visually depict a topology of a quantum device in a diagram that conveys quantum operational characteristics in a manner that improves readability of the operational characteristics of the quantum device by varying the distance of the lines interconnecting the nodes in the topology diagram based on the operational characteristics of the quantum device.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
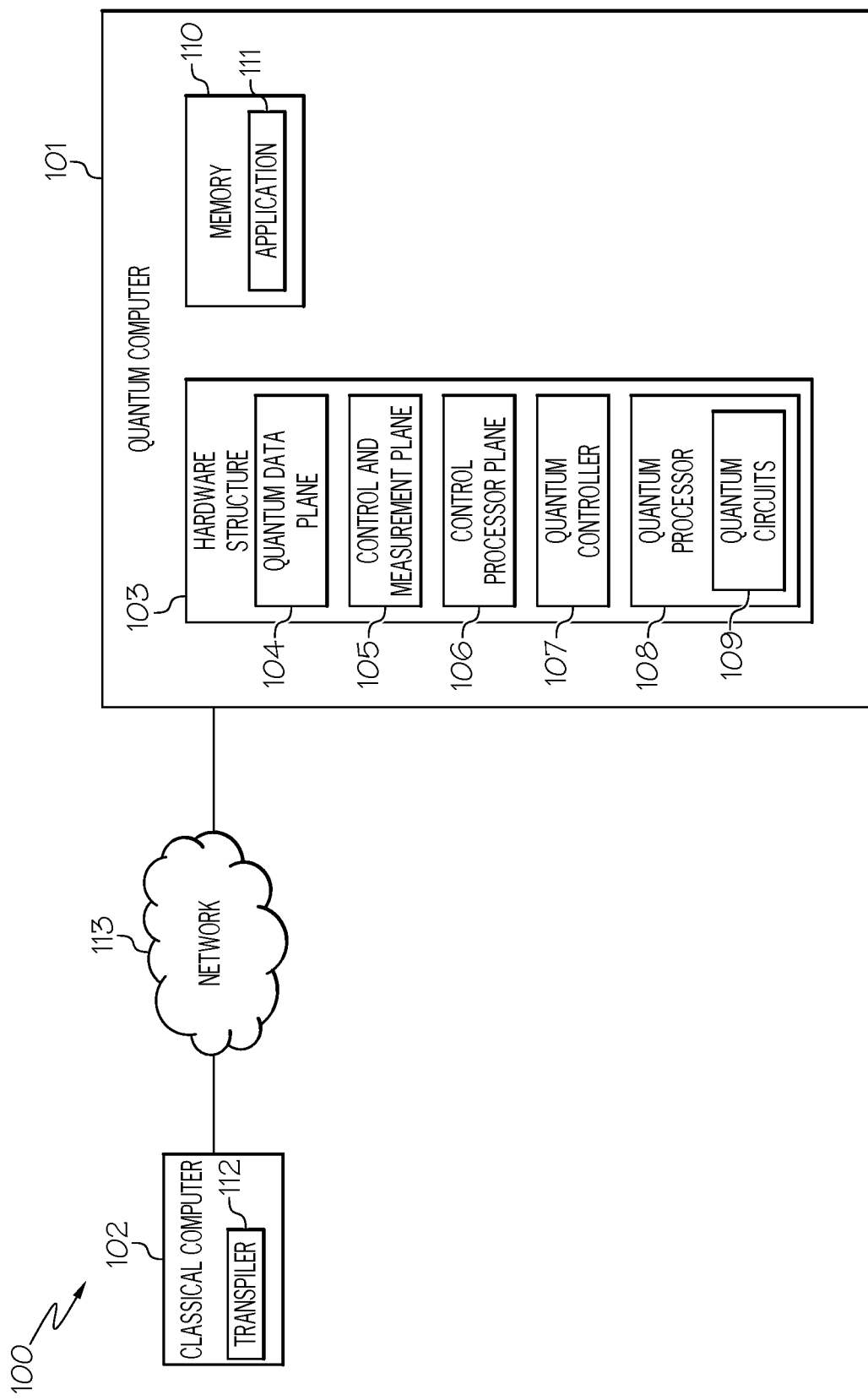
FIG. 1 illustrates a communication system for practicing the principles of the present disclosure in accordance with an embodiment of the present disclosure.

As stated in the Background section, in quantum computing and specifically the quantum circuit model of computation, a quantum logic gate (or simply quantum gate) is a basic quantum circuit operating on a small number of qubits. They are the building blocks of quantum circuits, such as classical logic gates being the building blocks of conventional digital circuits.

There are various tools for visually displaying the hardware topology of a quantum device comprised of quantum logic gates operating on qubits. For example, IBM® Quantum visually depicts a quantum device consisting of quantum logic gates operating on qubits. In such a depiction, qubits may be represented as circles and the supported two-qubit gate operations are displayed as lines connecting the qubits.

Unfortunately, users may not be able to infer the operational characteristics of the quantum device based on such a depiction.

The embodiments of the present disclosure provide the means for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device as discussed in further detail below.

In some embodiments of the present disclosure, the present disclosure comprises a method, system and computer program product for visually depicting a topology of a quantum device. In one embodiment of the present disclosure, quantum system calibration data is retrieved, where the quantum system calibration data includes the number of qubits utilized by the quantum device and a coupling map, which provides connectivity data pertaining to how qubits of the quantum device are interconnected. "Quantum system calibration data," as used herein, refers to the properties of the quantum device that are dynamically updated at system calibration time. "Properties," as used herein, refer to the characteristics of the quantum device, such as the number of qubits, the pairs of qubits that support two-qubit gate operations between them, the connectivity between the qubits, etc. A "coupling map," as used herein, refers to a diagram that indicates the pairs of qubits that support two-qubit gate operations between them. Furthermore, the operational characteristics of the quantum device are retrieved. "Operational characteristics," as used herein, refer to the features or qualities of the functions performed by the quantum device, such as the error rate, execution time, etc. In one embodiment, the quantum system calibration data and the operational characteristics are obtained from the execution of the quantum device. In another embodiment, the quantum system calibration data and the operational characteristics are generated by simulating the quantum device. A topology (connectivity) diagram of the quantum device is then generated and displayed based on the quantum system calibration data and the operational characteristics of the quantum device. In one embodiment, such a topology represents the qubit layout of the hardware of the quantum device, where the nodes in the topology diagram represent the qubits utilized by the quantum device and the nodes are interconnected in the topology diagram based on the coupling map. Furthermore, each operational characteristic of the retrieved operational characteristics (error rates) of the quantum device corresponds to an operational characteristic (e.g., error rate) involving qubits represented by the two nodes. Additionally, the distance of each line interconnecting two nodes is based on the operational characteristic involving the qubits represented by two nodes of the quantum device, such as the value of the operational characteristic involving the qubits represented by the two nodes. In this manner, the principles of the present disclosure visually depict a topology of a quantum device that conveys quantum operational characteristics in a manner that improves readability of the operational characteristics of the quantum device by varying the distance of the lines interconnecting the nodes in the topology diagram based on the operational characteristics of the quantum device.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 is configured to assist users (e.g., designers, researchers) in creating quantum devices by visually depicting a topology of the quantum device that conveys quantum operational characteristics in a manner that improves readability of the operational characteristics of the quantum device by varying the distance of the lines interconnecting the nodes in the topology diagram based on the operational characteristics of the quantum device as discussed further below.

In one embodiment, a hardware structure 103 of quantum computer 101 includes a quantum data plane 104, a control and measurement plane 105, a control processor plane 106, a quantum controller 107 and a quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are all reversible. Examples of quantum logic gates include RX (performs $e^{i\theta X}$, which corresponds to a rotation of the qubit state around the X-axis by the given angle theta θ on the Bloch sphere), RY (performs $e^{i\theta Y}$, which corresponds to a rotation of the qubit state around the Y-axis by the given angle theta θ on the Bloch sphere), RXX (performs the operation $e^{(-i\theta/2 X \oplus X)}$ on the input qubit), RZZ (takes in one input, an angle theta θ expressed in radians, and it acts on two qubits), etc. In one embodiment, quantum circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 include memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device as discussed further below in connection with FIGS. 2-9. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to visually depict a topology of a quantum device that conveys quantum operational characteristics in a manner that improves readability of the operational characteristics of the quantum device by varying the distance of the lines interconnecting the nodes in the topology diagram based on the operational characteristics of the quantum device as discussed further below in connection with FIGS. 2-9. A description of the software components of classical computer 102 is provided below in connection with FIG. 2 and a description of the hardware configuration of classical computer 102 is provided further below in connection with FIG. 8.

System 100 is not to be limited in scope to any one particular network architecture. System 100 may include any number of quantum computers 101, classical computers 102 and networks 113.

A discussion regarding the software components used by classical computer 102 for visually depicting a topology of a quantum device that conveys quantum operational characteristics is provided below in connection with FIG. 2.

Figure 2:
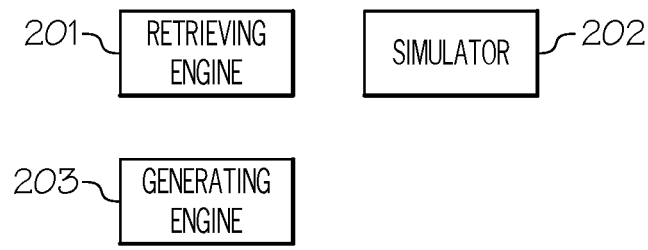
FIG. 2 is a diagram of the software components of the classical computer for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device in accordance with an embodiment of the present disclosure.

FIG. 2 is a diagram of the software components of classical system 102 (FIG. 1) for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device in accordance with an embodiment of the present disclosure.

Referring to FIG. 2, in conjunction with FIG. 1, classical computer 102 includes a retrieving engine 201 configured to retrieve quantum system calibration data. "Quantum system calibration data," as used herein, refers to the properties of the quantum device that are dynamically updated at system calibration time. "Properties," as used herein, refer to the characteristics of the quantum device, such as the number of qubits, the pairs of qubits that support two-qubit gate operations between them, the connectivity between the qubits, etc. In one embodiment, the properties of the quantum device are updated once this calibration sequence is complete. In one embodiment, such properties play an important role in quantum circuit execution, as the parameters within the properties are utilized herein for determining the operational characteristics of the quantum device.

In one embodiment, the quantum system calibration data is obtained by retrieving engine 201 from the execution of the quantum device using various tools, such as IBM® Quantum, ProjectQ, etc. In another embodiment, the quantum system calibration data may be generated by simulating a quantum device using a simulator 202. Examples of simulator 202 include, but not limited to, the Qiskit® Aer simulator, IQS, staq, QuEST®, QX Simulator, QMDD, CHP, etc. In one embodiment, the quantum system calibration data is stored in a file, such as a calibrations CSV (comma-separated values) file. In one embodiment, the quantum system calibration data includes the system (or quantum device) name, the system (or quantum device) version, the last update date (gives the local time at which the properties information was last updated), the qubits and the gates. For example, with respect to the quantum system calibration data involving the qubits, such data includes the physical attributes of the qubits, such as the qubit frequency, readout error, probability of preparing a given computational basis state, etc. In one embodiment, each qubit parameter is expressed as an Nduv (name, date, unit value) object containing the local time at which the parameter was updated, the parameter name, parameter units and the actual numerical parameter value. In another example, with respect to the quantum system calibration data involving the gates, such data includes the type of gate, a list specifying the qubits on which the gate acts, gate parameters (e.g., gate error, gate length), etc.

Furthermore, in one embodiment, the quantum system calibration data includes a coupling map which provides connectivity data pertaining to how the qubits of the quantum device are interconnected. A "coupling map," as used herein, refers to a diagram that indicates the pairs of qubits that support two-qubit gate operations between them. In such a coupling map, the connections between the qubits may be determined. In one embodiment, such a coupling map includes the attributes, such as the list of qubits and the connections between such qubits.

Additionally, in one embodiment, retrieving engine 201 retrieves the operational characteristics of the quantum device. "Operational characteristics," as used herein, refer to the features or qualities of the functions performed by the quantum device, such as the error rate, execution time, etc. In one embodiment, such operational characteristics are obtained by retrieving engine 201 from the execution of the quantum device using various tools, such as IBM® Quantum, ProjectQ, etc. In another embodiment, such operational characteristics are generated by simulating the quantum device by simulator 202. For example, in one embodiment, error rates, such as the CNOT (control NOT gate) error between 2 qubits, is obtained by the tools discussed above or by simulator 202 using the BackendProperties.gate_error method in Qiskit®. In another example, error rates, such as the CNOT error rate, is obtained by the tools discussed above or by simulator 202 utilizing the two-qubit randomizing benchmarking (RB). In one embodiment, such randomized RB consists of the generation of random Clifford circuits on the given qubits such that the unitary computed by the circuits is the identity. A Clifford circuit is a quantum circuit of Clifford gates implementing a unitary transformation on some set of qubits. In one embodiment, such Clifford circuits are simulated by simulator 202 (e.g., Qiskit® Aer simulator, IQS, staq, QuEST®, QX Simulator, QMDD, CHP, etc.).

In another example, in one embodiment, the execution time, such as the gate execution time, is obtained from the execution of the quantum device using various tools, such as IBM® Quantum, ProjectQ, etc. Alternatively, in one embodiment, the execution time, such as the gate execution time, is obtained by simulator 202. As discussed above, a quantum logic gate (or simply quantum gate) is a basic quantum circuit operating on a small number of qubits. The quantum gate performs an operation on the qubits. For example, a quantum NOT gate performs the operation that flips the qubit to 1 if it is in the state 0 and 0 if it is in the state 1. A controlled NOT (CNOT) gate takes two qubits, the target and the control, and performs the NOT operation on the target bit if the control has the value of 1. The time for performing such operations corresponds to the gate execution time, which can be determined by the tools discussed above or by simulator 202. Examples of simulator 202 include, but not limited to, the Qiskit® Aer simulator, IQS, staq, QuEST®, QX Simulator, QMDD, CHP, etc.

Classical computer 102 further includes a generating engine 203 configured to generate and display a topology (connectivity) diagram of the quantum device based on the quantum system calibration data and the operational characteristics of the quantum device retrieved by retrieving engine 201. In one embodiment, such a topology represents the qubit layout of the hardware of the quantum device. In one embodiment, generating engine 203 generates and displays a topology (connectivity) diagram of the quantum device based on the quantum system calibration data and the operational characteristics of the quantum device retrieved by retrieving engine 201 using various tools, including, but not limited to, IBM® Quantum.

In one embodiment, as discussed further below, each operational characteristic (e.g., error rate) of the retrieved operational characteristics (error rates) of the quantum device corresponds to an operational characteristic involving the qubits represented by two nodes in the displayed topology diagram. Furthermore, as discussed further below, a distance of each line interconnecting two nodes in the topology diagram is based on the operational characteristic involving the qubits represented by the two nodes of the quantum device.

Figure 3:
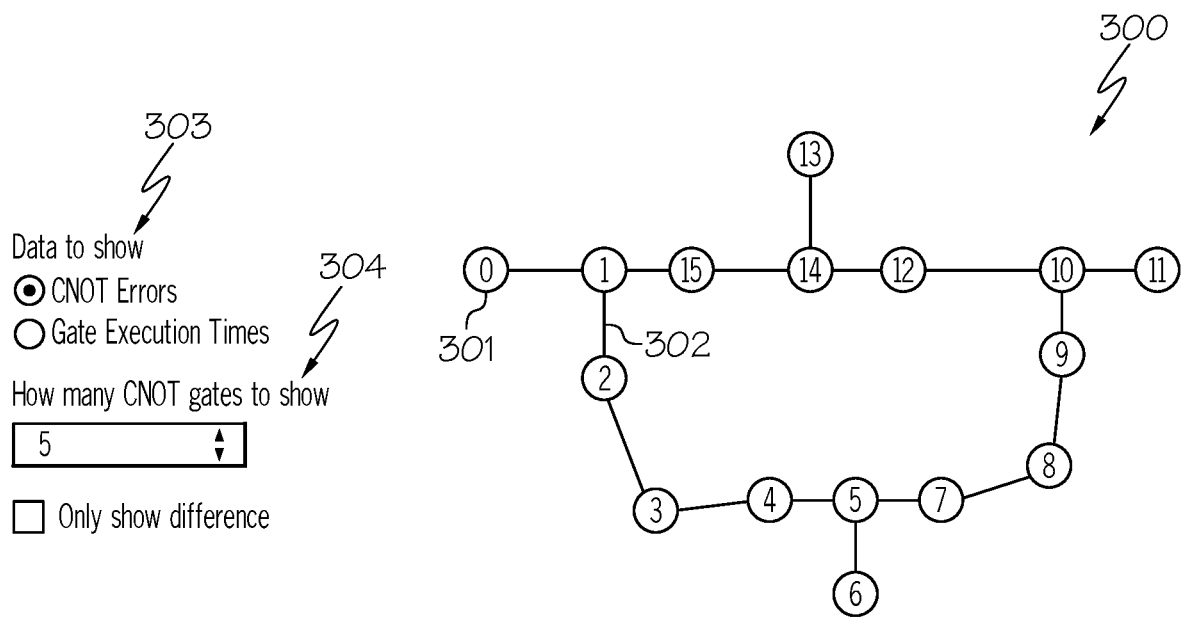
FIG. 3 illustrates a visual depiction of the topology of a quantum device in accordance with an embodiment of the present disclosure.

In one embodiment, the topology diagram generated by generating engine 203 includes a visual display of the qubits utilized by the quantum device, such as shown in FIG. 3.

FIG. 3 illustrates a visual depiction (diagram 300) of the topology of a quantum device in accordance with an embodiment of the present disclosure.

As shown in FIG. 3, topology diagram 300 depicts the qubits utilized by the quantum device which are represented by nodes 301. As illustrated in FIG. 3, the quantum device utilizes 16 qubits which is shown by having nodes 301 labeled 0 to 15. Furthermore, as illustrated in FIG. 3, nodes 301 are interconnected by lines 302 in topology diagram 300 based on the coupling map discussed above. For example, topology diagram 300 illustrates the coupling map of [[0, 1], [1, 0], [1, 2], [2, 1], [1, 15], [15, 1], [2, 3], [3, 2], [3, 4], [4, 3], [4, 5], [5, 4], [5, 6], [6, 5], [5, 7], [7, 5], [7, 8], [8, 7], [8, 9], [9, 8], [9, 10], [10, 9], [10, 11], [11, 10], [10, 12], [12, 10], [12, 14], [14, 12], [14, 13], [13, 14], [14, 15], [15, 14]], where each set of numbers in [ ] represents the interconnection between the two specified qubits. For instance, qubits 0 and 1 are interconnected as well as qubits 1 and 15; however, qubits 1 and 12 are not interconnected.

In one embodiment, lines 302 interconnecting nodes 301 are drawn by generating engine 203 using force direction (also referred to as "force-directed graph drawing"). "Force direction" or "force-directed graph drawing," as used herein, refers to a class of algorithms for drawing graphs in which nodes 301 in topology diagram 300 are positioned in such a manner by assigning force among the set of edges (lines). In one embodiment, such a force is based on the operational characteristics of the quantum device. That is, such a force is proportional to a value of an operational characteristic involving the qubits represented by nodes 301. In one embodiment, such a force is utilized to control the distance of each line 302 interconnecting two nodes 301, which is based on the operational characteristic (value of the operational characteristic) involving the qubits represented by the two nodes.

In one embodiment, generating engine 203 utilizes a force-directed graph drawing algorithm to generate topology diagrams, such as the topology diagram shown in FIG. 3 (as well as FIGS. 4-7 discussed further below). In one embodiment, such an algorithm is based on a physical model. In one embodiment, nodes 301 are represented as points in a plane that are electrically charged and apply repulsive forces against each other, where such forces correlate to the operational characteristics involving such nodes 301. Edges (or lines 302) connect these points simulating a spring-force, attracting adjacent nodes 301. The model iteratively determines the resulting forces that act on nodes 301 and moves nodes 301 closer to an equilibrium where the "equilibrium" between the two particular nodes 301 in the topology diagram, such as topology diagram 300, corresponds to the value of the operational characteristic (e.g., error rate) involving the qubits represented by those two nodes 301. As a result, the distance of the edge or line 302 between every two nodes 301 in the topology diagram, such as topology diagram 300, is based on the operational characteristic value involving the qubits represented by those two nodes 301.

In one embodiment, generating engine 203 utilizes various graph visualization tools for implementing a force-directed graph drawing algorithm for generating and displaying such topology diagrams, including, but not limited to, CCVisu, ForceAtlas2, OpenOrd, Nevada, etc.

In one embodiment, the visualization technique of the present disclosure includes an option for a user, such as a user of classical computer 102, to select the operational characteristics to be depicted in topology diagram 300 by way of varying the distance of each line 302 interconnecting nodes 301 based on the value of the operational characteristic involving such nodes 301. For example, as shown in FIG. 3, a drop-down menu 303 may allow the user, such as the user of classical computer 102, to select the operational characteristics (e.g., CNOT errors, gate execution times) to be depicted in topology diagram 300. As shown in FIG. 3, the user selects the operational characteristics of CNOT error, which results in a drop-down menu 304 requesting the user to select the number of CNOT gates to be depicted.

Figure 4:
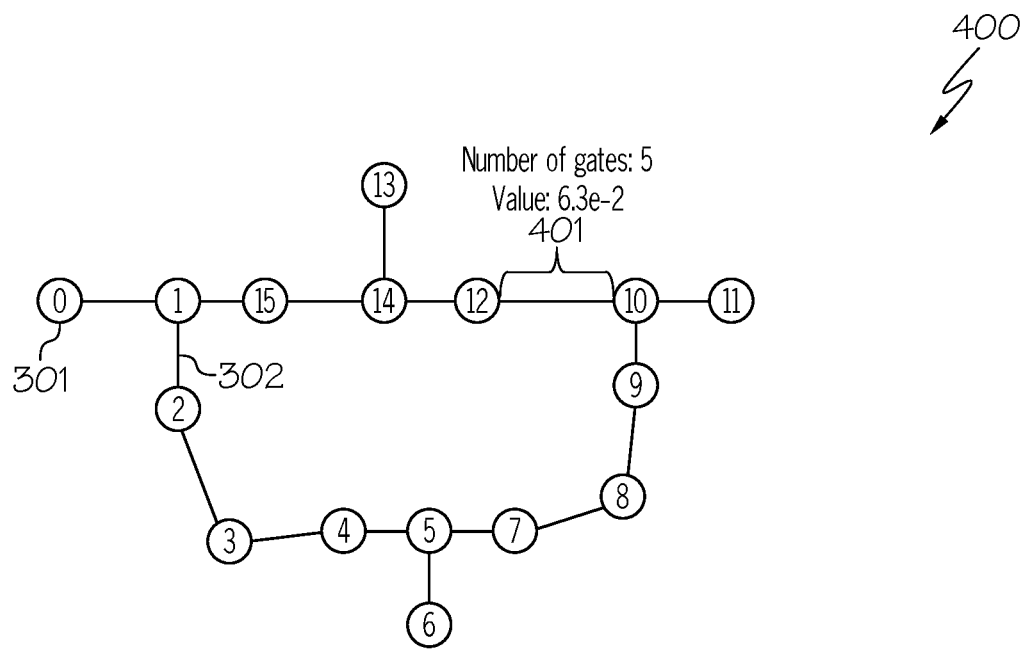
FIG. 4 illustrates a topology diagram of the quantum device in which the distance of each line interconnecting the nodes is proportional to the value of the operational characteristics involving CNOT errors in accordance with an embodiment of the present disclosure.

An example of a topology diagram 400 generated by generating engine 203 depicting the operational characteristics of the error rates, such as the CNOT errors, is shown in FIG. 4.

FIG. 4 illustrates a topology diagram 400 of the quantum device in which the distance of each line 302 interconnecting nodes 301 is proportional to the value of the operational characteristics involving the CNOT errors in accordance with an embodiment of the present disclosure.

Referring to FIG. 4, in conjunction with FIG. 3, as shown in FIG. 4, topology diagram 400 depicts the hardware layout of a quantum device with 5 CNOT gates (selected using drop-down menu 304). In such a layout, the CNOT errors were computed based on the execution of the quantum device or by performing the simulation of such a quantum device by simulator 202 as discussed above. Such data may then be utilized by generating engine 203 to determine the distance of line 302 between each pair of nodes 301 (each node 301 representing a qubit) based on the CNOT error involving such qubits linked together. For instance, the distance of line 401 is based on the CNOT error ($6.3e^{-2}$)

involving the qubits represented by nodes 301 labeled 10 and 12 for the hardware layout depicted in FIG. 4 utilizing 5 CNOT gates.

Figure 5:
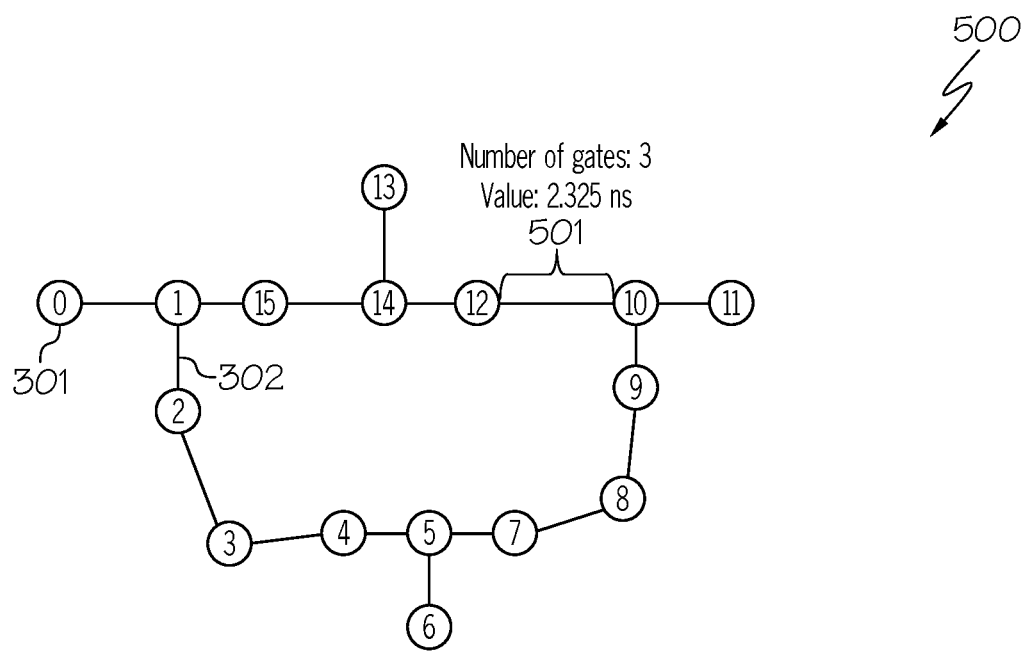
FIG. 5 illustrates a topology diagram of the quantum device in which the distance of each line interconnecting the nodes is proportional to the value of the operational characteristics involving the gate execution times in accordance with an embodiment of the present disclosure.

An example of a topology diagram 500 generated by generating engine 203 depicting the operational characteristics of execution times, such as the gate execution times, is shown in FIG. 5.

FIG. 5 illustrates a topology diagram 500 of the quantum device in which the distance of each line 302 interconnecting nodes 301 is proportional to the value of the operational characteristic involving the gate execution times in accordance with an embodiment of the present disclosure.

Referring to FIG. 5, in conjunction with FIG. 3, as shown in FIG. 5, topology diagram 500 depicts the hardware layout of a quantum device in which the gate execution times are computed based on the execution of the quantum device or by performing the simulation of such a quantum device utilizing 3 gates by simulator 202 as discussed above. Such data (gate execution times) may then be utilized by generating engine 203 to determine the distance of line 302 between each pair of nodes 301 (each node 301 representing a qubit) based on the gate execution time involving such qubits linked together. For instance, the distance of line 501 is based on the gate execution time (2.325 ns) involving the qubits represented by nodes 301 labeled 10 and 12 for the hardware layout depicted in FIG. 5 utilizing 3 gates. In one embodiment, the distance (length in pixels) of line 302 between nodes 301 is equal to the gate time*the number of gates.

Figure 6:
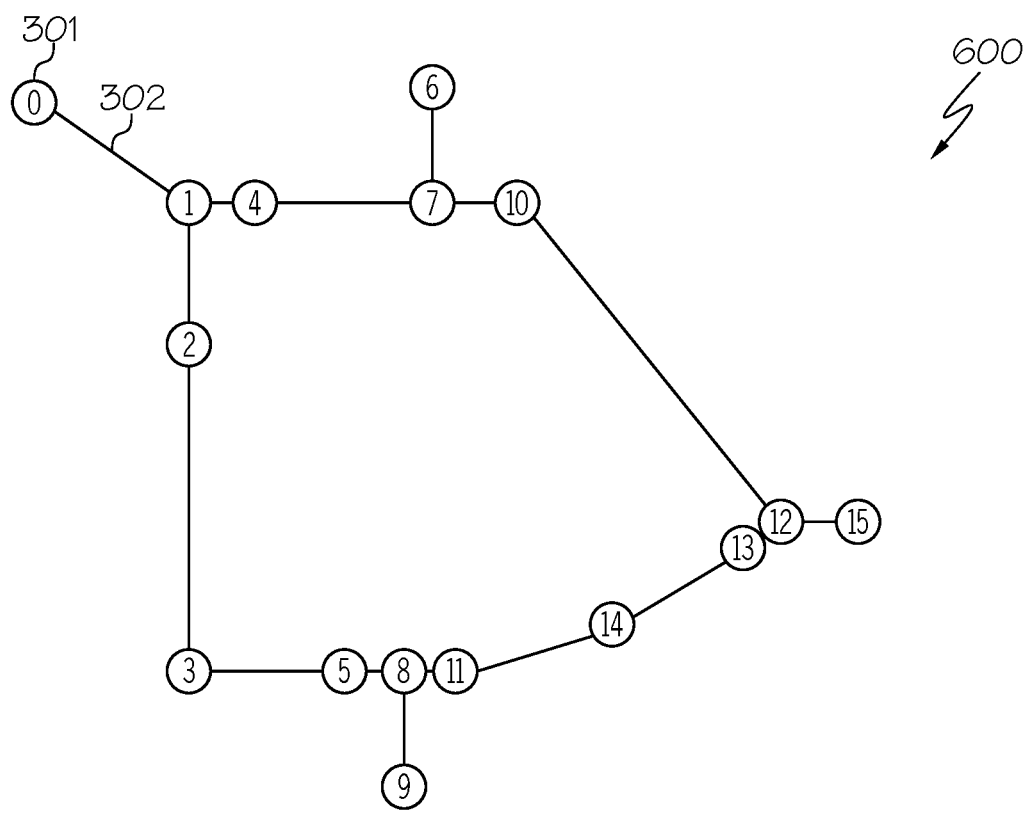
FIG. 6 illustrates a topology diagram of the quantum device in which the distance of each line interconnecting the nodes corresponds to a relative range of values of the operational characteristics in accordance with an embodiment of the present disclosure.

Generating engine 203 may also generate topology diagrams that depict the relative range of values, such as the relative range of values of the operational characteristics involving the qubits represented by nodes 301 as illustrated in FIG. 6.

FIG. 6 illustrates a topology diagram 600 of the quantum device in which the distance of each line 302 interconnecting nodes 301 corresponds to a relative range of values of the operational characteristics in accordance with an embodiment of the present disclosure.

For example, for the operational characteristics of the error rates (e.g., CNOT errors), generating engine 203 obtains the list of error values involving the qubits represented by nodes 301 from the execution of the quantum device using various tools, such as IBM® Quantum, ProjectQ, etc. or from simulating a quantum device represented by the hardware layout depicted in FIG. 6 by simulator 202. Based on the list of error values, generating engine 203 identifies the lowest error value and then subtracts that value from all the other values. In one embodiment, generating engine 203 redraws the plot (topology diagram 600) so that the lowest value is drawn as a distance of 0 and the largest line 302 is the greatest value minus the lowest value.

Figure 7:
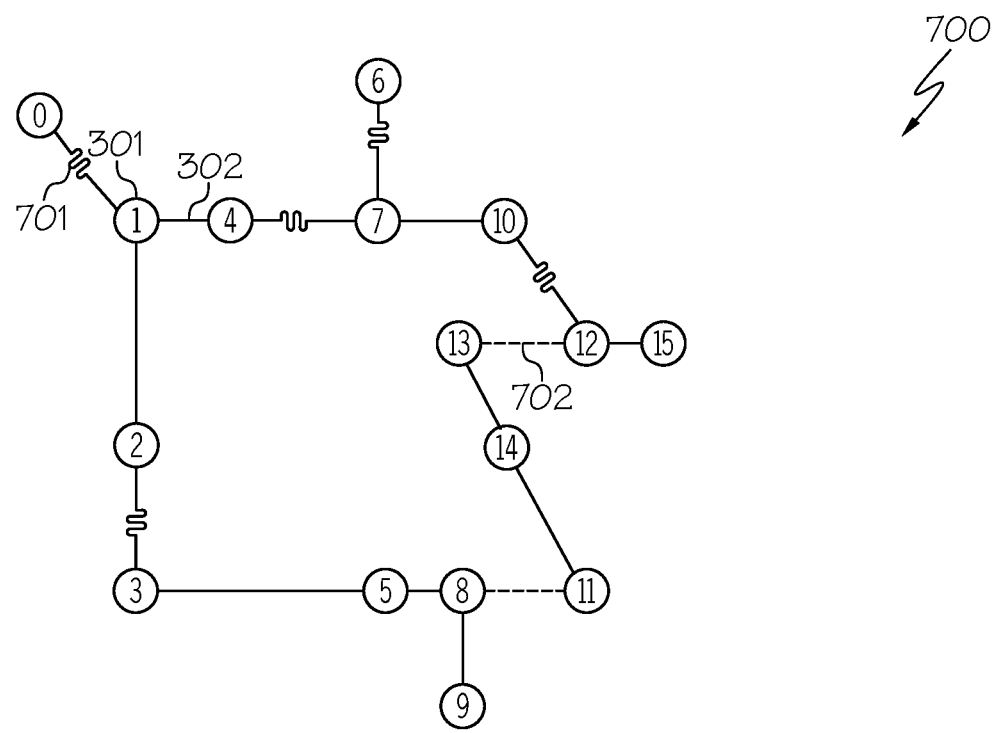
FIG. 7 illustrates a topology diagram of the quantum device utilizing symbols to truncate or expand a visual distance in accordance with an embodiment of the present disclosure.

Generating engine 203 may also generate topology diagrams that include symbols to truncate or expand a visual distance in situations in which lines 302 are too long or too short to be properly visualized as shown in FIG. 7.

FIG. 7 illustrates a topology diagram 700 of the quantum device utilizing symbols 701, 702 to truncate or expand a visual distance in accordance with an embodiment of the present disclosure.

As shown in FIG. 7, such symbols 701, 702 are utilized to truncate or expand a visual distance. For example, in one embodiment, generating engine 203 utilizes a method (e.g., standard deviation, interquartile range, order of magnitude) of assessing the data (operational characteristics) which may be user-selected, such as by a user of classical computer 102 via a graphical user interface of classical computer 102.

In one embodiment, one of the methods of assessing data is determining the standard deviation. The standard deviation, as used herein, refers to a measure of how dispersed the data is in relation to the mean. In another embodiment, one of the methods of assessing data is determining the interquartile range, which indicates the spread of the middle half of the distribution of the data. In a further embodiment, one of the methods of assessing data is determining the order of magnitude, which corresponds to the relative size, quantity, quality, etc.

In one embodiment, in response to selecting the standard deviation as a method of assessing the data, line 302 may be drawn as a straight line for values that are within 1 standard deviation of the mean, symbol 701 may be drawn for values greater than a standard deviation of the mean in the positive direction and symbol 702 may be drawn for values greater than a standard deviation from the mean in the negative direction.

In one embodiment, in response to selecting the interquartile range as a method of assessing the data, line 302 may be drawn as a straight line for values that are within the interquartile range, symbol 701 may be drawn for values outside the interquartile range in the positive direction and symbol 702 may be drawn for values outside the interquartile range in the negative direction.

In one embodiment, in response to selecting the order of magnitude as a method of assessing the data, line 302 may be drawn as a straight line for values that are within a user-designated order of magnitude, symbol 701 may be drawn for values that are beyond the user-designated order of magnitude in the positive direction and symbol 702 may be drawn for values that are beyond the user-designated order of magnitude in the negative direction.

In this manner, symbols may be utilized to truncate or expand a visual distance in situations in which lines 302 are too long or too short to be properly visualized.

A further description of these and other functions is provided below in connection with the discussion of the method for visually depicting a topology of a quantum device that conveys quantum operational characteristics in a manner that improves readability of the operational characteristics of the quantum device.

Prior to the discussion of the method for visually depicting a topology of a quantum device that conveys quantum operational characteristics in a manner that improves readability of the operational characteristics of the quantum device, a description of the hardware configuration of classical computer 102 (FIG. 1) is provided below in connection with FIG. 8.

Figure 8:
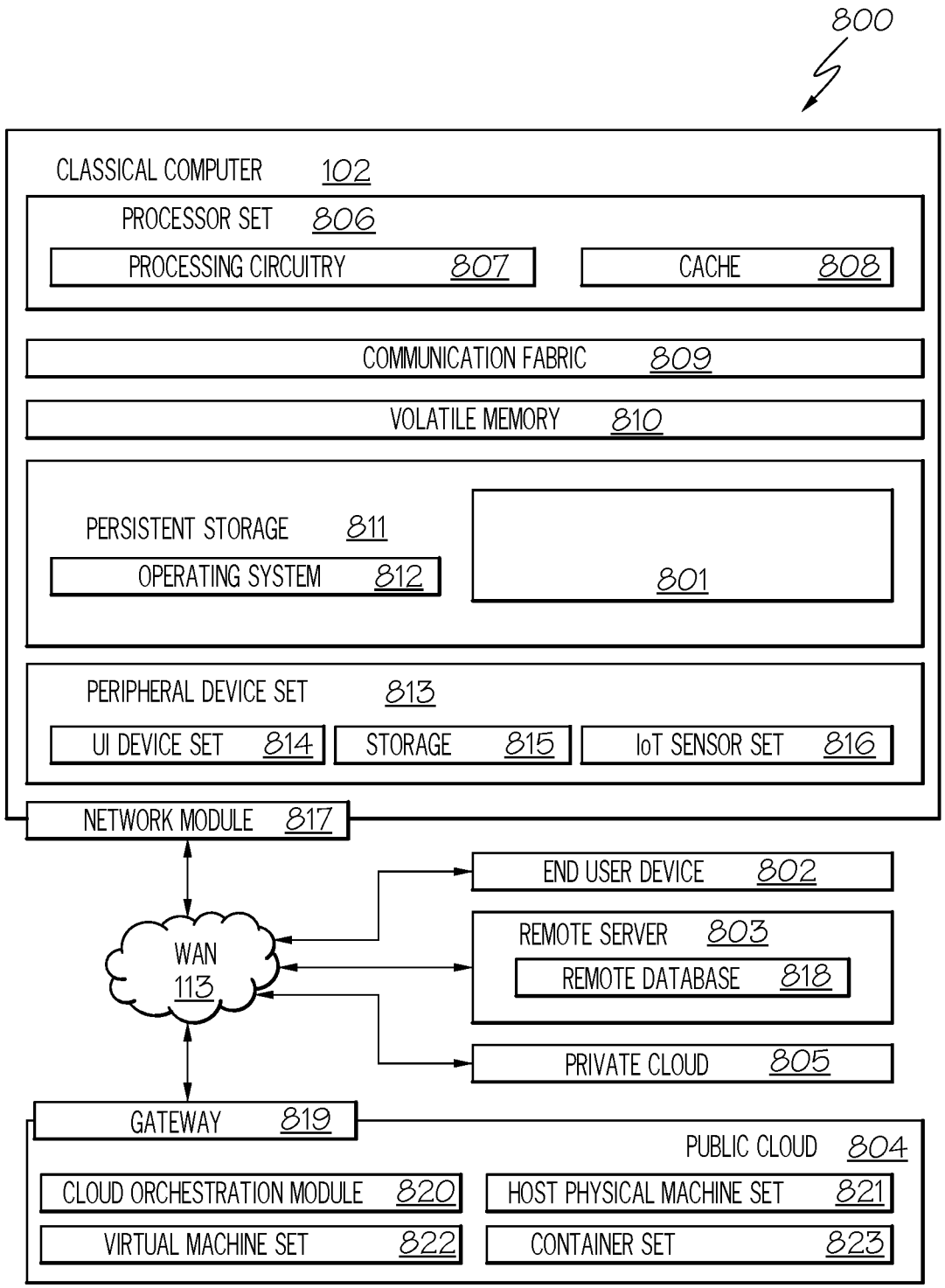
FIG. 8 illustrates an embodiment of the present disclosure of the hardware configuration of the classical computer which is representative of a hardware environment for practicing the present disclosure.

Referring now to FIG. 8, in conjunction with FIG. 1, FIG. 8 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as visually depicting a topology of a quantum device that conveys quantum operational characteristics in a manner that improves readability of the operational characteristics of the quantum device. In addition to block 801, computing environment 800 includes, for example, classical computer 102, network 113, such as a wide area network (WAN), end user device (EUD) 802, remote server 803, public cloud 804, and private cloud 805. In this embodiment, classical computer 102 includes processor set 806 (including processing circuitry 807 and cache 808), communication fabric 809, volatile memory 810, persistent storage 811 (including operating system 812 and block 801, as identified above), peripheral device set 813 (including user interface (UI) device set 814, storage 815, and Internet of Things (IOT) sensor set 816), and network module 817. Remote server 803 includes remote database 818. Public cloud 804 includes gateway 819, cloud orchestration module 820, host physical machine set 821, virtual machine set 822, and container set 823.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 818. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically classical computer 102, to keep the presentation as simple as possible. Classical computer 102 may be located in a cloud, even though it is not shown in a cloud in FIG. 8. On the other hand, classical computer 102 is not required to be in a cloud except to any extent as may be affirmatively indicated.

Processor set 806 includes one, or more, computer processors of any type now known or to be developed in the future. Processing circuitry 807 may be distributed over multiple packages, for example, multiple, coordinated integrated circuit chips. Processing circuitry 807 may implement multiple processor threads and/or multiple processor cores. Cache 808 is memory that is located in the processor chip package(s) and is typically used for data or code that should be available for rapid access by the threads or cores running on processor set 806. Cache memories are typically organized into multiple levels depending upon relative proximity to the processing circuitry. Alternatively, some, or all, of the cache for the processor set may be located "off chip." In some computing environments, processor set 806 may be designed for working with qubits and performing quantum computing.

Computer readable program instructions are typically loaded onto classical computer 102 to cause a series of operational steps to be performed by processor set 806 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 808 and the other storage media discussed below. The program instructions, and associated data, are accessed by processor set 806 to control and direct performance of the inventive methods. In computing environment 800, at least some of the instructions for performing the inventive methods may be stored in block 801 in persistent storage 811.

Communication fabric 809 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 810 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 810 is located in a single package and is internal to classical computer 102, but, alternatively or additionally, the volatile memory may be distributed over multiple packages and/or located externally with respect to classical computer 102.

Persistent Storage 811 is any form of non-volatile storage for computers that is now known or to be developed in the future. The non-volatility of this storage means that the stored data is maintained regardless of whether power is being supplied to classical computer 102 and/or directly to persistent storage 811. Persistent storage 811 may be a read only memory (ROM), but typically at least a portion of the persistent storage allows writing of data, deletion of data and re-writing of data. Some familiar forms of persistent storage include magnetic disks and solid state storage devices. Operating system 812 may take several forms, such as various known proprietary operating systems or open source Portable Operating System Interface type operating systems that employ a kernel. The code included in block 801 typically includes at least some of the computer code involved in performing the inventive methods.

Peripheral device set 813 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 814 may include components such as a display screen, speaker, microphone, wearable devices (such as goggles and smart watches), keyboard, mouse, printer, touchpad, game controllers, and haptic devices. Storage 815 is external storage, such as an external hard drive, or insertable storage, such as an SD card. Storage 815 may be persistent and/or volatile. In some embodiments, storage 815 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 816 is made up of sensors that can be used in Internet of Things applications. For example, one sensor may be a thermometer and another sensor may be a motion detector.

Network module 817 is the collection of computer software, hardware, and firmware that allows classical computer 102 to communicate with other computers through WAN 113. Network module 817 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 817 are performed on the same physical hardware device. In other embodiments (for example, embodiments that utilize software-defined networking (SDN)), the control functions and the forwarding functions of network module 817 are performed on physically separate devices, such that the control functions manage several different network hardware devices. Computer readable program instructions for performing the inventive methods can typically be downloaded to classical computer 102 from an external computer or external storage device through a network adapter card or network interface included in network module 817.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 802 is any computer system that is used and controlled by an end user (for example, a customer of an enterprise that operates classical computer 102), and may take any of the forms discussed above in connection with classical computer 102. EUD 802 typically receives helpful and useful data from the operations of classical computer 102. For example, in a hypothetical case where classical computer 102 is designed to provide a recommendation to an end user, this recommendation would typically be communicated from network module 817 of classical computer 102 through WAN 113 to EUD 802. In this way, EUD 802 can display, or otherwise present, the recommendation to an end user. In some embodiments, EUD 802 may be a client device, such as thin client, heavy client, mainframe computer, desktop computer and so on.

Remote server 803 is any computer system that serves at least some data and/or functionality to classical computer 102. Remote server 803 may be controlled and used by the same entity that operates classical computer 102. Remote server 803 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 818 of remote server 803.

Public cloud 804 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 804 is performed by the computer hardware and/or software of cloud orchestration module 820. The computing resources provided by public cloud 804 are typically implemented by virtual computing environments that run on various computers making up the computers of host physical machine set 821, which is the universe of physical computers in and/or available to public cloud 804. The virtual computing environments (VCEs) typically take the form of virtual machines from virtual machine set 822 and/or containers from container set 823. It is understood that these VCEs may be stored as images and may be transferred among and between the various physical machine hosts, either as images or after instantiation of the VCE. Cloud orchestration module 820 manages the transfer and storage of images, deploys new instantiations of VCEs and manages active instantiations of VCE deployments. Gateway 819 is the collection of computer software, hardware, and firmware that allows public cloud 804 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 805 is similar to public cloud 804, except that the computing resources are only available for use by a single enterprise. While private cloud 805 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 804 and private cloud 805 are both part of a larger hybrid cloud.

Block 801 further includes the software components discussed above in connection with FIGS. 2-7 to visually depict a topology of a quantum device that conveys quantum operational characteristics in a manner that improves readability of the operational characteristics of the quantum device. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for visually depicting a topology of a quantum device that conveys quantum operational characteristics in a manner that improves readability of the operational characteristics of the quantum device, may be embodied in an application specific integrated circuit.

As stated above, in quantum computing and specifically the quantum circuit model of computation, a quantum logic gate (or simply quantum gate) is a basic quantum circuit operating on a small number of qubits. They are the building blocks of quantum circuits, such as classical logic gates being the building blocks of conventional digital circuits. There are various tools for visually displaying the hardware topology of a quantum device comprised of quantum logic gates operating on qubits. For example, IBM® Quantum visually depicts a quantum device consisting of quantum logic gates operating on qubits. In such a depiction, qubits may be represented as circles and the supported two-qubit gate operations are displayed as lines connecting the qubits. Unfortunately, users may not be able to infer the operational characteristics of the quantum device based on such a depiction.

The embodiments of the present disclosure provide the means for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device as discussed below in connection with FIG. 9.

Figure 9:
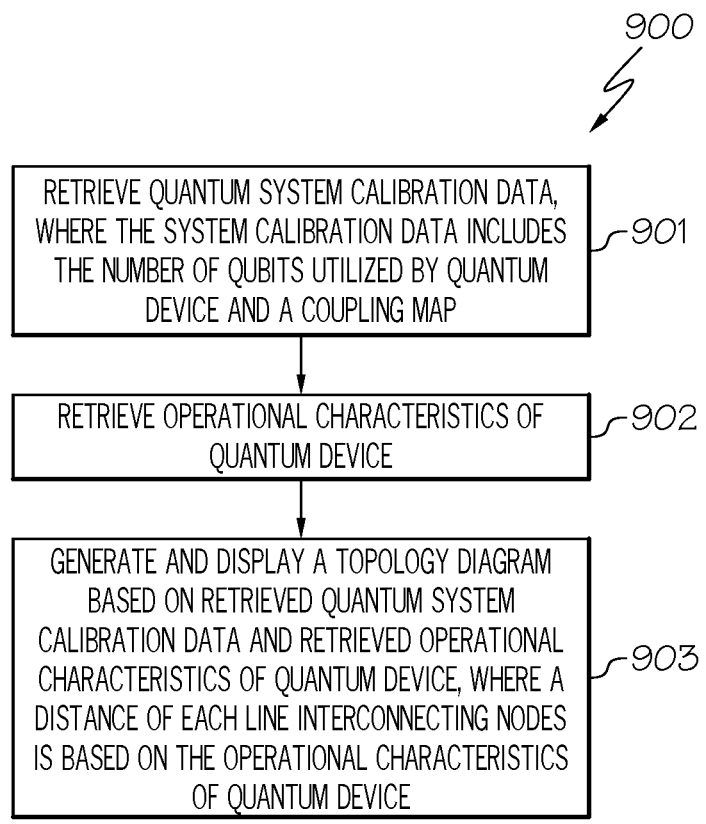
FIG. 9 is a flowchart of a method for visually depicting the topology of a quantum device that conveys quantum operational characteristics in a manner that improves readability of the operational characteristics of the quantum device in accordance with an embodiment of the present disclosure.

FIG. 9 is a flowchart of a method 900 for visually depicting the topology of a quantum device that conveys quantum operational characteristics in a manner that improves readability of the operational characteristics of the quantum device in accordance with an embodiment of the present disclosure.

Referring to FIG. 9, in conjunction with FIGS. 1-8, in step 901, retrieving engine 201 of classical computer 102 retrieves quantum system calibration data, where the quantum system calibration data includes the number of qubits utilized by the quantum device and a coupling map.

As discussed above, "quantum system calibration data," as used herein, refers to the properties of the quantum device that are dynamically updated at system calibration time. "Properties," as used herein, refer to the characteristics of the quantum device, such as the number of qubits, the pairs of qubits that support two-qubit gate operations between them, the connectivity between the qubits, etc. In one embodiment, the properties of the quantum device are updated once this calibration sequence is complete. In one embodiment, such properties play an important role in quantum circuit execution, as the parameters within the properties are utilized herein for determining the operational characteristics of the quantum device.

In one embodiment, the quantum system calibration data is obtained by retrieving engine 201 from the execution of the quantum device using various tools, such as IBM® Quantum, ProjectQ, etc. In another embodiment, the quantum system calibration data may be generated by simulating a quantum device using a simulator 202. Examples of simulator 202 include, but not limited to, the Qiskit® Aer simulator, IQS, staq, QuEST®, QX Simulator, QMDD, CHP, etc. In one embodiment, the quantum system calibration data is stored in a file, such as a calibrations CSV (comma-separated values) file. In one embodiment, the quantum system calibration data includes the system (or quantum device) name, the system (or quantum device) version, the last update date (gives the local time at which the properties information was last updated), the qubits and the gates. For example, with respect to the quantum system calibration data involving the qubits, such data includes the physical attributes of the qubits, such as the qubit frequency, readout error, probability of preparing a given computational basis state, etc. In one embodiment, each qubit parameter is expressed as an Nduv (name, date, unit value) object containing the local time at which the parameter was updated, the parameter name, parameter units and the actual numerical parameter value. In another example, with respect to the quantum system calibration data involving the gates, such data includes the type of gate, a list specifying the qubits on which the gate acts, gate parameters (e.g., gate error, gate length), etc.

Furthermore, in one embodiment, the quantum system calibration data includes a coupling map which provides connectivity data pertaining to how the qubits of the quantum device are interconnected. A "coupling map," as used herein, refers to a diagram that indicates the pairs of qubits that support two-qubit gate operations between them. In such a coupling map, the connections between the qubits may be determined. In one embodiment, such a coupling map includes the attributes, such as the list of qubits and the connections between such qubits.

In step 902, retrieving engine 201 of classical computer 102 retrieves the operational characteristics of the quantum device.

As stated above, "operational characteristics," as used herein, refer to the features or qualities of the functions performed by the quantum device, such as the error rate, execution time, etc. In one embodiment, such operational characteristics are obtained by retrieving engine 201 from the execution of the quantum device using various tools, such as IBM® Quantum, ProjectQ, etc. In another embodiment, such operational characteristics are generated by simulating the quantum device by simulator 202. For example, in one embodiment, error rates, such as the CNOT (control NOT gate) error between 2 qubits, is obtained by the tools discussed above or by simulator 202 using the BackendProperties.gate_error method in Qiskit®. In another example, error rates, such as the CNOT error rate, is obtained by the tools discussed above or by simulator 202 utilizing the two-qubit randomizing benchmarking (RB). In one embodiment, such randomized RB consists of the generation of random Clifford circuits on the given qubits such that the unitary computed by the circuits is the identity. A Clifford circuit is a quantum circuit of Clifford gates implementing a unitary transformation on some set of qubits. In one embodiment, such Clifford circuits are simulated by simulator 202 (e.g., Qiskit® Aer simulator, IQS, staq, QuEST®, QX Simulator, QMDD, CHP, etc.).

In another example, in one embodiment, the execution time, such as the gate execution time, is obtained from the execution of the quantum device using various tools, such as IBM® Quantum, ProjectQ, etc. Alternatively, in one embodiment, the execution time, such as the gate execution time, is obtained by simulator 202. As discussed above, a quantum logic gate (or simply quantum gate) is a basic quantum circuit operating on a small number of qubits. The quantum gate performs an operation on the qubits. For example, a quantum NOT gate performs the operation that flips the qubit to 1 if it is in the state 0 and 0 if it is in the state 1. A controlled NOT (CNOT) gate takes two qubits, the target and the control, and performs the NOT operation on the target bit if the control has the value of 1. The time for performing such operations corresponds to the gate execution time, which can be determined by the tools discussed above or by simulator 202. Examples of simulator 202 include, but not limited to, the Qiskit® Aer simulator, IQS, staq, QuEST®, QX Simulator, QMDD, CHP, etc.

In step 903, generating engine 203 of classical computer 102 generates and displays a topology (connectivity) diagram of the quantum device based on the quantum system calibration data and the operational characteristics of the quantum device retrieved by retrieving engine 201. In one embodiment, such a topology represents the qubit layout of the hardware of the quantum device. In one embodiment, generating engine 203 generates and displays a topology (connectivity) diagram of the quantum device based on the quantum system calibration data and the operational characteristics of the quantum device retrieved by retrieving engine 201 using various tools, including, but not limited to, IBM® Quantum.

In one embodiment, as discussed further below, each operational characteristic (e.g., error rate) of the retrieved operational characteristics (error rates) of the quantum device corresponds to an operational characteristic involving the qubits represented by two nodes in the displayed topology diagram. Furthermore, as discussed further below, a distance of each line interconnecting two nodes in the topology diagram is based on the operational characteristic involving the qubits represented by the two nodes of the quantum device.

In one embodiment, the topology diagram generated by generating engine 203 includes a visual display of the qubits utilized by the quantum device, such as shown in FIG. 3.

As shown in FIG. 3, topology diagram 300 depicts the qubits utilized by the quantum device which are represented by nodes 301. As illustrated in FIG. 3, the quantum device utilizes 16 qubits which is shown by having nodes 301 labeled 0 to 15. Furthermore, as illustrated in FIG. 3, nodes 301 are interconnected by lines 302 in topology diagram 300 based on the coupling map discussed above. For example, topology diagram 300 illustrates the coupling map of [[0, 1], [1, 0], [1, 2], [2, 1], [1, 15], [15, 1], [2, 3], [3, 2], [3, 4], [4, 3], [4, 5], [5, 4], [5, 6], [6, 5], [5, 7], [7, 5], [7, 8], [8, 7], [8, 9], [9, 8], [9, 10], [10, 9], [10, 11], [11, 10], [10, 12], [12, 10], [12, 14], [14, 12], [14, 13], [13, 14], [14, 15], [15, 14]], where each set of numbers in [ ] represents the interconnection between the two specified qubits. For instance, qubits 0 and 1 are interconnected as well as qubits 1 and 15; however, qubits 1 and 12 are not interconnected.

In one embodiment, lines 302 interconnecting nodes 301 are drawn by generating engine 203 using force direction (also referred to as "force-directed graph drawing"). "Force direction" or "force-directed graph drawing," as used herein, refers to a class of algorithms for drawings graphs in which nodes 301 in topology diagram 300 are positioned in such a manner by assigning force among the set of edges (lines). In one embodiment, such a force is based on the operational characteristics of the quantum device. That is, such a force is proportional to a value of an operational characteristic involving the qubits represented by nodes 301. In one embodiment, such a force is utilized to control the distance of each line 302 interconnecting two nodes 301, which is based on the operational characteristic (value of the operational characteristic) involving the qubits represented by the two nodes.

In one embodiment, generating engine 203 utilizes a force-directed graph drawing algorithm to generate topology diagrams, such as the topology diagram shown in FIG. 3 (as well as FIGS. 4-7). In one embodiment, such an algorithm is based on a physical model. In one embodiment, nodes 301 are represented as points in a plane that are electrically charged and apply repulsive forces against each other, where such forces correlate to the operational characteristics involving such nodes 301. Edges (or lines 302) connect these points simulating a spring-force, attracting adjacent nodes 301. The model iteratively determines the resulting forces that act on nodes 301 and moves nodes 301 closer to an equilibrium where the "equilibrium" between the two particular nodes 301 in the topology diagram, such as topology diagram 300, corresponds to the value of the operational characteristic (e.g., error rate) involving the qubits represented by those two nodes 301. As a result, the distance of the edge or line 302 between every two nodes 301 in the topology diagram, such as topology diagram 300, is based on the operational characteristic value involving the qubits represented by those two nodes 301.

In one embodiment, generating engine 203 utilizes various graph visualization tools for implementing a force-directed graph drawing algorithm for generating and displaying such topology diagrams, including, but not limited to, CCVisu, ForceAtlas2, OpenOrd, Nevada, etc.

Furthermore, an example of a topology diagram 400 generated by generating engine 203 depicting the operational characteristics of the error rates, such as the CNOT errors, is shown in FIG. 4.

As shown in FIG. 4, topology diagram 400 depicts the hardware layout of a quantum device with 5 CNOT gates (selected using drop-down menu 304). In such a layout, the CNOT errors were computed based on the execution of the quantum device or by performing the simulation of such a quantum device by simulator 202 as discussed above. Such data may then be utilized by generating engine 203 to determine the distance of line 302 between each pair of nodes 301 (each node 301 representing a qubit) based on the CNOT error involving such qubits linked together. For instance, the distance of line 401 is based on the CNOT error ($6.3e^{-2}$) involving the qubits represented by nodes 301 labeled 10 and 12 for the hardware layout depicted in FIG. 4 utilizing 5 CNOT gates.

An example of a topology diagram 500 generated by generating engine 203 depicting the operational characteristics of execution times, such as the gate execution times, is shown in FIG. 5.

As shown in FIG. 5, topology diagram 500 depicts the hardware layout of a quantum device in which the gate execution times are computed based on the execution of the quantum device or by performing the simulation of such a quantum device utilizing 3 gates by simulator 202 as discussed above. Such data (gate execution times) may then be utilized by generating engine 203 to determine the distance of line 302 between each pair of nodes 301 (each node 301 representing a qubit) based on the gate execution time involving such qubits linked together. For instance, the distance of line 501 is based on the gate execution time (2.325 ns) involving the qubits represented by nodes 301 labeled 10 and 12 for the hardware layout depicted in FIG. 5 utilizing 3 gates. In one embodiment, the distance (length in pixels) of line 302 between nodes 301 is equal to the gate time*the number of gates.

Generating engine 203 may also generate topology diagrams that depict the relative range of values, such as the relative range of values of the operational characteristics involving the qubits represented by nodes 301 as illustrated in FIG. 6.

For example, for the operational characteristics of the error rates (e.g., CNOT errors), generating engine 203 obtains the list of error values involving the qubits represented by nodes 301 from the execution of the quantum device using various tools, such as IBM® Quantum, ProjectQ, etc. or from simulating a quantum device represented by the hardware layout depicted in FIG. 6 by simulator 202. Based on the list of error values, generating engine 203 identifies the lowest error value and then subtracts that value from all the other values. In one embodiment, generating engine 203 redraws the plot (topology diagram 600) so that the lowest value is drawn as a distance of 0 and the largest line 302 is the greatest value minus the lowest value.

Generating engine 203 may also generate topology diagrams that include symbols to truncate or expand a visual distance in situations in which lines 302 are too long or too short to be properly visualized as shown in FIG. 7.

As shown in FIG. 7, such symbols 701, 702 are utilized to truncate or expand a visual distance. For example, in one embodiment, generating engine 203 utilizes a method (e.g., standard deviation, interquartile range, order of magnitude) of assessing the data (operational characteristics) which may be user-selected, such as by a user of classical computer 102 via a graphical user interface of classical computer 102.

In one embodiment, one of the methods of assessing data is determining the standard deviation. The standard deviation, as used herein, refers to a measure of how dispersed the data is in relation to the mean. In another embodiment, one of the methods of assessing data is determining the interquartile range, which indicates the spread of the middle half of the distribution of the data. In a further embodiment, one of the methods of assessing data is determining the order of magnitude, which corresponds to the relative size, quantity, quality, etc.

In one embodiment, in response to selecting the standard deviation as a method of assessing the data, line 302 may be drawn as a straight line for values that are within 1 standard deviation of the mean, symbol 701 may be drawn for values greater than a standard deviation of the mean in the positive direction and symbol 702 may be drawn for values greater than a standard deviation from the mean in the negative direction.

In one embodiment, in response to selecting the interquartile range as a method of assessing the data, line 302 may be drawn as a straight line for values that are within the interquartile range, symbol 701 may be drawn for values outside the interquartile range in the positive direction and symbol 702 may be drawn for values outside the interquartile range in the negative direction.

In one embodiment, in response to selecting the order of magnitude as a method of assessing the data, line 302 may be drawn as a straight line for values that are within a user-designated order of magnitude, symbol 701 may be drawn for values that are beyond the user-designated order of magnitude in the positive direction and symbol 702 may be drawn for values that are beyond the user-designated order of magnitude in the negative direction.

In this manner, symbols may be utilized to truncate or expand a visual distance in situations in which lines 302 are too long or too short to be properly visualized.

As a result of the foregoing, the principles of the present disclosure provide a means for visually depicting a topology of a quantum device that conveys quantum operational characteristics in a manner that improves readability of the operational characteristics of the quantum device by varying the distance of the lines interconnecting the nodes in the topology diagram based on the operational characteristics of the quantum device.

Furthermore, the principles of the present disclosure improve the technology or technical field involving tools for visualizing quantum hardware topology.

As discussed above, in quantum computing and specifically the quantum circuit model of computation, a quantum logic gate (or simply quantum gate) is a basic quantum circuit operating on a small number of qubits. They are the building blocks of quantum circuits, such as classical logic gates being the building blocks of conventional digital circuits. There are various tools for visually displaying the hardware topology of a quantum device comprised of quantum logic gates operating on qubits. For example, IBM® Quantum visually depicts a quantum device consisting of quantum logic gates operating on qubits. In such a depiction, qubits may be represented as circles and the supported two-qubit gate operations are displayed as lines connecting the qubits. Unfortunately, users may not be able to infer the operational characteristics of the quantum device based on such a depiction.

Embodiments of the present disclosure improve such technology by retrieving quantum system calibration data, where the quantum system calibration data includes the number of qubits utilized by the quantum device and a coupling map, which provides connectivity data pertaining to how qubits of the quantum device are interconnected. "Quantum system calibration data," as used herein, refers to the properties of the quantum device that are dynamically updated at system calibration time. "Properties," as used herein, refer to the characteristics of the quantum device, such as the number of qubits, the pairs of qubits that support two-qubit gate operations between them, the connectivity between the qubits, etc. A "coupling map," as used herein, refers to a diagram that indicates the pairs of qubits that support two-qubit gate operations between them. Furthermore, the operational characteristics of the quantum device are retrieved. "Operational characteristics," as used herein, refer to the features or qualities of the functions performed by the quantum device, such as the error rate, execution time, etc. In one embodiment, the quantum system calibration data and the operational characteristics are obtained from the execution of the quantum device. In another embodiment, the quantum system calibration data and the operational characteristics are generated by simulating the quantum device. A topology (connectivity) diagram of the quantum device is then generated and displayed based on the quantum system calibration data and the operational characteristics of the quantum device. In one embodiment, such a topology represents the qubit layout of the hardware of the quantum device, where the nodes in the topology diagram represent the qubits utilized by the quantum device and the nodes are interconnected in the topology diagram based on the coupling map. Furthermore, each operational characteristic of the retrieved operational characteristics (error rates) of the quantum device corresponds to an operational characteristic (e.g., error rate) involving qubits represented by the two nodes. Additionally, the distance of each line interconnecting two nodes is based on the operational characteristic involving the qubits represented by two nodes of the quantum device, such as the value of the operational characteristic involving the qubits represented by the two nodes. In this manner, the principles of the present disclosure visually depict a topology of a quantum device that conveys quantum operational characteristics in a manner that improves readability of the operational characteristics of the quantum device by varying the distance of the lines interconnecting the nodes in the topology diagram based on the operational characteristics of the quantum device. Furthermore, in this manner, there is an improvement in the technical field involving tools for visualizing quantum hardware topology.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a method for visually depicting a topology of a quantum device comprises retrieving quantum system calibration data, where the quantum system calibration data comprises a coupling map and a number of qubits utilized by the quantum device, and where the coupling map provides connectivity data pertaining to how qubits of the quantum device are interconnected. The method further comprises retrieving operational characteristics of the quantum device. The method additionally comprises generating and displaying a topology diagram based on the retrieved quantum system calibration data and the retrieved operational characteristics of the quantum device, where the topology diagram comprises a plurality of nodes representing the qubits utilized by the quantum device, where the plurality of nodes are interconnected in the topology diagram based on the coupling map, where each operational characteristic of the retrieved operational characteristics of the quantum device corresponds to an operational characteristic involving qubits represented by two nodes, and where a distance of each line interconnecting two nodes of the plurality of nodes is based on the operational characteristic involving the qubits represented by the two nodes of the quantum device.

Additionally, in one embodiment of the present disclosure, the distance of each line interconnecting the two nodes of the plurality of nodes is proportional to a value of the operational characteristic involving the qubits represented by the two nodes.

Furthermore, in one embodiment of the present disclosure, the operational characteristic is selected from the group consisting of an error rate and an execution time.

Additionally, in one embodiment of the present disclosure, the distance of each line interconnecting the two nodes of the plurality of nodes corresponds to a relative range of values of the operational characteristic involving the qubits represented by the two nodes.

Furthermore, in one embodiment of the present disclosure, the one or more lines in the topology diagram utilize a symbol to truncate or expand a visual distance.

Additionally, in one embodiment of the present disclosure, the symbol represents one of the following in the group consisting of a standard deviation, an interquartile range and an order of magnitude in a positive or a negative direction.

Furthermore, in one embodiment of the present disclosure, the operational characteristics of the quantum device are obtained from one or more simulations of the quantum device.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for visually depicting a topology of a quantum device, the method comprising:

retrieving quantum system calibration data, wherein said quantum system calibration data comprises a coupling map and a number of qubits utilized by said quantum device, wherein said coupling map provides connectivity data pertaining to how qubits of said quantum device are interconnected;

retrieving operational characteristics of said quantum device; and generating and displaying a topology diagram based on said retrieved quantum system calibration data and said retrieved operational characteristics of said quantum device, wherein said topology diagram comprises a plurality of nodes representing said qubits utilized by said quantum device, wherein said plurality of nodes are interconnected in said topology diagram based on said coupling map, wherein each operational characteristic of said retrieved operational characteristics of said quantum device corresponds to an operational characteristic involving qubits represented by two nodes, wherein a distance of each line interconnecting two nodes of said plurality of nodes is based on said operational characteristic involving said qubits represented by said two nodes of said quantum device.

2. The method as recited in claim 1, wherein said distance of each line interconnecting said two nodes of said plurality of nodes is proportional to a value of said operational characteristic involving said qubits represented by said two nodes.

3. The method as recited in claim 2, wherein said operational characteristic is selected from the group consisting of an error rate and an execution time.

4. The method as recited in claim 1, wherein said distance of each line interconnecting said two nodes of said plurality of nodes corresponds to a relative range of values of said operational characteristic involving said qubits represented by said two nodes.

5. The method as recited in claim 1, wherein one or more lines in said topology diagram utilize a symbol to truncate or expand a visual distance.

6. The method as recited in claim 5, wherein said symbol represents one of the following in the group consisting of a standard deviation, an interquartile range and an order of magnitude in a positive or a negative direction.

7. The method as recited in claim 1, wherein said operational characteristics of said quantum device are obtained from execution of said quantum device.

8. A computer program product for visually depicting a topology of a quantum device, the computer program product comprising one or more computer readable storage mediums having program code embodied therewith, the program code comprising programming instructions for:
retrieving quantum system calibration data, wherein said quantum system calibration data comprises a coupling map and a number of qubits utilized by said quantum device, wherein said coupling map provides connectivity data pertaining to how qubits of said quantum device are interconnected;
retrieving operational characteristics of said quantum device; and
generating and displaying a topology diagram based on said retrieved quantum system calibration data and said retrieved operational characteristics of said quantum device, wherein said topology diagram comprises a plurality of nodes representing said qubits utilized by said quantum 11 device, wherein said plurality of nodes are interconnected in said topology diagram based on said coupling map, wherein each operational characteristic of said retrieved operational characteristics of said quantum device corresponds to an operational characteristic involving qubits represented by two nodes, wherein a distance of each line interconnecting two nodes of said plurality of nodes is based on said operational characteristic involving said qubits represented by said two nodes of said quantum device.

9. The computer program product as recited in claim 8, wherein said distance of each line interconnecting said two nodes of said plurality of nodes is proportional to a value of said operational characteristic involving said qubits represented by said two nodes.

10. The computer program product as recited in claim 9, wherein said operational characteristic is selected from the group consisting of an error rate and an execution time.

11. The computer program product as recited in claim 8, wherein said distance of each line interconnecting said two nodes of said plurality of nodes corresponds to a relative range of values of said operational characteristic involving said qubits represented by said two nodes.

12. The computer program product as recited in claim 8, wherein one or more lines in said topology diagram utilize a symbol to truncate or expand a visual distance.

13. The computer program product as recited in claim 12, wherein said symbol represents one of the following in the group consisting of a standard deviation, an interquartile range and an order of magnitude in a positive or a negative direction.

14. The computer program product as recited in claim 8, wherein said operational characteristics of said quantum device are obtained from execution of said quantum device.

15. A system, comprising:
a memory for storing a computer program for visually depicting a topology of a quantum device; and
a processor connected to said memory, wherein said processor is configured to execute program instructions of the computer program comprising:
retrieving quantum system calibration data, wherein said quantum system calibration data comprises a coupling map and a number of qubits utilized by said quantum device, wherein said coupling map provides connectivity data pertaining to how qubits of said quantum device are interconnected;
retrieving operational characteristics of said quantum device; and
generating and displaying a topology diagram based on said retrieved quantum system calibration data and said retrieved operational characteristics of said quantum device, wherein said topology diagram comprises a plurality of nodes representing said qubits utilized by said quantum device, wherein said plurality of nodes are interconnected in said topology diagram based on said coupling map, wherein each operational characteristic of said retrieved operational characteristics of said quantum device corresponds to an operational characteristic involving qubits represented by two nodes, wherein a distance of each line interconnecting two nodes of said plurality of nodes is based on said operational characteristic involving said qubits represented by said two nodes of said quantum device.

16. The system as recited in claim 15, wherein said distance of each line interconnecting said two nodes of said plurality of nodes is proportional to a value of said operational characteristic involving said qubits represented by said two nodes.

17. The system as recited in claim 16, wherein said operational characteristic is selected from the group consisting of an error rate and an execution time.

18. The system as recited in claim 15, wherein said distance of each line interconnecting said two nodes of said plurality of nodes corresponds to a relative range of values of said operational characteristic involving said qubits represented by said two nodes.

19. The system as recited in claim 15, wherein one or more lines in said topology diagram utilize a symbol to truncate or expand a visual distance.

20. The system as recited in claim 19, wherein said symbol represents one of the following in the group consisting of a standard deviation, an interquartile range and an order of magnitude in a positive or a negative direction.

* * * * *